United States Patent [19]

Stoll et al.

[11] Patent Number: 4,514,364
[45] Date of Patent: Apr. 30, 1985

[54] METHOD FOR REPROCESSING A NUCLEAR REACTOR FUEL ROD

[75] Inventors: Wolfgang Stoll, Hanau; Karl Ennerst, Kleinostheim, both of Fed. Rep. of Germany

[73] Assignee: Alkem GmbH, Hanau, Fed. Rep. of Germany

[21] Appl. No.: 518,142

[22] Filed: Jul. 28, 1983

[30] Foreign Application Priority Data

Aug. 3, 1982 [DE] Fed. Rep. of Germany ....... 3228979

[51] Int. Cl.³ ............................................. C01G 43/00
[52] U.S. Cl. ...................................... 423/4; 252/627; 252/630; 423/20
[58] Field of Search ................ 252/627, 630; 423/4, 423/20

[56] References Cited

U.S. PATENT DOCUMENTS

| | | | |
|---|---|---|---|
| 3,165,377 | 1/1965 | Katz | 423/4 |
| 3,560,169 | 2/1971 | Larsson et al. | 423/4 |
| 3,808,320 | 4/1974 | Kaiser et al. | 423/4 |
| 3,825,649 | 7/1974 | Gresky et al. | 423/4 |
| 4,174,369 | 11/1979 | John | 423/4 |
| 4,283,367 | 8/1981 | Koeppe et al. | 252/630 |
| 4,296,074 | 10/1981 | Yosim | 252/627 |
| 4,349,453 | 9/1982 | Brugère et al. | 252/630 |
| 4,361,541 | 11/1982 | Bings et al. | 423/3 |

FOREIGN PATENT DOCUMENTS 1097597 1/1968 United Kingdom ................ 423/4

OTHER PUBLICATIONS

Stoller et al., *Reactor Handbook*, 2nd ed., vol. 2, "Fuel Reprocessing", pp. 42–45, Interscience Publ., Inc., (1961), New York.

*Primary Examiner*—Edward A. Miller
*Attorney, Agent, or Firm*—Herbert L. Lerner; Laurence A. Greenberg

[57] ABSTRACT

Reprocessing a nuclear reactor fuel rod which contains nuclear fuel in a cladding tube, by removing the cladding tube from the nuclear fuel. The cladding tube is uniformly heated in hermetically sealed condition together with the nuclear fuel contained thereon to permanently expand the diameter of the cladding tube without the formation of cracks in the cladding tube, increasing the distance between the nuclear fuel and the cladding tube. Subsequently the expanded cladding tube is opened at one end. The nuclear fuel is removed from the opened cladding tube and is processed further, separate from the cladding tube.

5 Claims, 1 Drawing Figure

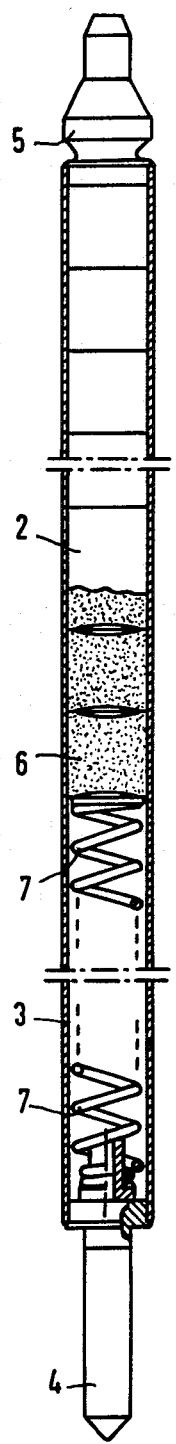

4,514,364

METHOD FOR REPROCESSING A NUCLEAR REACTOR FUEL ROD

BACKGROUND OF THE INVENTION

1. Field of the Invention

The invention relates to a method for reprocessing a nuclear reactor fuel rod which contains nuclear fuel in a cladding tube, by removing the cladding tube from the nuclear fuel.

2. Description of the Prior Art

British Pat. No. 1,097,597 discloses such a method. The nuclear reactor fuel rod to be reprocessed according to the method of the British Patent has a cladding tube of a magnesium alloy, in which is contained a uranium metal body as the nuclear fuel. The cladding tube is heated up on a shredder by electric high-frequency current, is expanded and softened thereby and is finally shaved off from the uranium metal body by shredder cylinders. The fuel rod is located in the shredder with the cylinder surface of its cladding tube between two shredder cylinders parallel to the axis. The shredder cylinders have cutting teeth on their outside surface and are guided along the longitudinal axis of the fuel rod which rotates about this longitudinal axis. After the cladding tube has been removed in the shredder, the uranium metal body is further processed chemically.

In the process, cladding tube material cannot be precluded but is also fed to the further chemical treatment together with the uranium metal body, specially because irradiated fuel rods are deformed irregularly. Also nuclear fuel sticks to the chips which are produced when shaving off the cladding tube. The chips can be separated from the nuclear fuel only at great expense.

SUMMARY OF THE INVENTION

An object of the invention is to provide a method of removing the cladding tube of a nuclear reactor fuel rod from nuclear fuel contained therein and recovering the nuclear fuel separated from the cladding tube with a materially reduced amount or substantially no cladding tube content.

With the foregoing and other objects in view, there is provided in accordance with the invention a method for reprocessing a nuclear reactor fuel rod which contains nuclear fuel in a cladding tube to effect separation of the cladding tube from the nuclear fuel, which includes uniformly heating the cladding tube in hermetically sealed condition together with the nuclear fuel contained therein to permanently expand the diameter of the cladding tube without the formation of cracks in the cladding tube, increasing the distance between the nuclear fuel and the cladding tube to permit the nuclear fuel to freely flow from the cladding tube; opening the expanded cladding tube at one end; separating the nuclear fuel from the cladding tube by discharging the nuclear fuel through the opening in the cladding tube, and recovering the separated nuclear fuel substantially free of cladding tube content.

Other features which are considered as characteristic for the invention are set forth in the appended claims.

Although the invention is illustrated and described herein as embodied in method for reprocessing a nuclear reactor fuel rod, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawing which diagrammatically illustrates an irradiated nuclear reactor fuel rod having a zirconium alloy cladding tube closed at both ends by end plugs. The tube contains $(U/Pu)O_2$ mixed oxide pellets and radioactive nuclear fission products. The fuel rod is heated in a muffle furnace for three hours at a temperature of 1200° C. to permanently expand the diameter of the cladding tube 10% without formation of cracks in the tube. The cladding tube is cooled to ambient temperature. The end cap is separated from the cladding tube. The nuclear fuel pellets which are not caked or do not adhere to the walls of the cladding tube are poured from the cladding tube. The thus separated nuclear fuel pellets are substantially free of cladding tube content.

DETAILED DESCRIPTION OF THE INVENTION

A method for reprocessing a nuclear fuel rod as mentioned at the outset is characterized, according to the invention, by the features that the cladding tube is uniformly heated in hermetically condition together with the nuclear fuel contained therein to permanently expand the diameter of the cladding tube without formation of cracks in the cladding tube to increase the distance between the nuclear fuel and the cladding tube. Subsequently, the expanded cladding tube is opened at one end; and thereafter nuclear fuel is removed from the opened cladding tube and is processed further, separate and apart from the cladding tube.

The expansion of the cladding tube consisting of metal is aided during the heating by increasing the gas pressure of gases contained in the hermetically sealed cladding tube which gases are also heated in the process. These heated gases may be gaseous fission products in irradiated nuclear reactor fuel rods which come, for instance, from nuclear reactor fuel assemblies burned-up in a nuclear reactor.

The permanent expansion of the cladding tube effects separation of joints between the nuclear fuel and the inside wall of the cladding tube which may have been produced by caking. Even oxidic, i.e., ceramic nuclear fuel such as nuclear fuel consisting of $(U/Pu)O_2$ mixed crystals can be shaken out at the opened end of the cladding tube without effort, utilizing the force of gravity. In this manner, separation of the nuclear fuel from the cladding tube can efficiently and economically be accomplished. Prior dissection of burned-up nuclear reactor fuel assemblies or prior disassembly of the irradiated fuel rod from such nuclear reactor fuel assemblies can be dispensed with in the method of the invention.

The nuclear fuel thus removed from the cladding tube contains no cladding tube material and can be milled very finely especially if it is ceramic nuclear fuel. The solubility of this nuclear fuel in a solvent and its mobility is thereby improved considerably. Since no cladding tube material, for instance, zirconium is contained in the removed nuclear fuel, the latter can be dissolved in the solvent at particularly high temperatures to further improve the solubility. As a rule, the cladding tube material consists of metals such as zirconium alloys which would react at particularly high solvent temperatures (solvents are as a rule acids, for instance nitric acid) with the solvent vigorously forming troublesome hydrogen. In addition, the risk of igniting the chips produced in comminuting the cladding tubes is eliminated.

If an irradiated nuclear reactor fuel rod is involved, the emptied cladding tube can be rolled flat and compacted with other cladding tubes rolled flat and thus taken to ultimate storage, saving space. Tritium produced during the operation in a nuclear reactor as a nuclear fission product is increasingly diffused after the mentioned heat treatment into the metallic material of the cladding tube which consists, for instance, of zirconium. Tritium is for all practical purposes not contained in the nuclear fuel of an irradiated fuel rod but in the material of the cladding tube of this irradiated fuel rod. The cladding tube together with tritium is taken to ultimate storage without the tritium causing a problem. Removing tritium from the dissolved nuclear fuel is therefore not necessary, at least not to the present extent.

Advantageously, the nuclear fuel removed from the cladding tube is dissolved in nitric acid in an autoclave. Dissolving hard-to-dissolve $(U/Pu)O_2$ mixed crystals can also be accomplished in such an autoclave.

If the nuclear fuel of a burned-up nuclear reactor fuel rod contains appreciable amounts of ruthenium, palladium and/or rhodium in oxide form, as is the case particularly, for instance, in the fuel rods of burned-up fuel assemblies of fast breeder reactors, it is advantageous for separating the highly radioactive chemical rare metal compounds from the dissolved nuclear fuel, to dissolve the nuclear fuel removed from the cladding tube in the autoclave in the presence of an oxygen-containing atmosphere, and also to separate volatile oxygen compounds particularly of ruthenium and other rare metals as well as of fission gases from the atmosphere in the autoclave by means of a cooling trap.

The invention and its advantages will be explained in greater detail by an embodiment example, making reference to the drawing:

In the drawing, a nuclear reactor fuel rod 2, irradiated in a nuclear reactor, is shown in a longitudinal section which is about 1500 mm long and has a diameter of about 14.5 mm. This fuel rod 2 has a cladding tube 3 of a zirconium alloy (Zirkaloy) which has a wall thickness of 0.6 mm. This cladding tube 3 is closed off at both ends by end plugs 4 and 5 which consist likewise of the zirconium alloy (Zirkaloy) and are welded to the cladding tube 3. Ceramic nuclear fuel pellets 6, which consist substantially of $(U/Pu)O_2$ mixed oxide are contained in the cladding tube. They further contain radioactive nuclear fission products. In the cladding tube 23 is a tension spring 7 of steel. The interior of the hermetically sealed cladding tube 3 is further filled with a protective gas consisting of helium and gaseous nuclear fission products.

For reprocessing the fuel rod 2, the latter is heated, with the cladding tube 3 closed gas-tight, in a muffle furnace at a temperature of 1200° C. for three hours. This heating can also be accomplished by means of an electric current which flows through the cladding tube 3 in the longitudinal direction. Thereby, the diameter of the cladding tube 3 is expanded on the average by 10% without formation of cracks in the cladding tube 3. The temperature and time can be varied somewhat, e.g. from 1150° C. to 1300° C. with a time of 6 to about 1½ hours. The temperature and time are such as will effect permanent expansion of the diameter without the formation of cracks in the cladding tube. The average diameter expansion is about 10% but may vary somewhat, e.g. from 7 to 12%. The fulfillment of these conditions is readily determined simply by measuring the diameter of the cooled tube, opening the tube, and pouring the fuel pellets therefrom.

Subsequently, the fuel rod 2 is removed from the muffle furnace. After it is cooled down to the ambient temperature of about 20° C., the cladding tube 3 has been expanded on the average to a permanent diameter, without formation of cracks, which is about 10% larger than the starting diameter. The end cap 5 is then separated from the cladding tube 3 by means of a cutting tool. Thereupon, the nuclear fuel pellets 6, including the pellets which were caked to the inside of the cladding tube 3 and were blasted off by the expansion in the muffle furance, are poured out of the cladding tube 3 by the force of gravity.

These nuclear fuel pellets 6 are mechanically comminuted in a ball mill into powder which has a grain size of less than 400 μm. This powder together with nitric acid is introduced into an autoclave which is then flushed with pure oxygen. Subsequently, the gas space in this autoclave is filled with pure oxygen with a pressure of about 20 bar and the autoclave is sealed gastight. Then, the nitric acid in the autoclave is heated to 220° C. and kept constant for about 20 hours. In the process, a pressure of about 64 bar adjusts itself in the autoclave.

After the autoclave has cooled down to the ambient temperature of about 20° C., a decompression line leading out of the autoclave is opened and the atmosphere flowing out of the autoclave is conducted over a cooling trap, in which oxygen compounds of ruthenium and other rare metals as well as iodine and krypton are separated. The nitric-acid nuclear fuel solution is finally fed to a customary process for further processing.

The expanded cladding tube 3 can initially still contain up to 0.5% by weight of irradiated nuclear fuel which is advantageously removed from the cladding tube 3 by vibration and deformation (roll-squeezing) and fed to the autoclave for dissolution in nitric acid.

The expanded cladding tube 3 can then be pressed together with empty cladding tubes of other irradiated fuel rods into cubes or cylinders, which are taken to ultimate storage, reducing the volume considerably.

There are claimed:

1. Method for reprocessing a nuclear reactor fuel rod which contains nuclear fuel in pellet form in a metal cladding tube to effect separation of the cladding tube from the nuclear fuel, which comprises uniformly heating the cladding tube in hermetically sealed condition together with the nuclear fuel contained therein to permanently expand the diameter of the cladding tube without the formation of cracks in the cladding tube, increasing the distance between the nuclear fuel and the cladding tube to permit the nuclear fuel to freely flow from the cladding tube; opening the expanded cladding tube at one end; separating the nuclear fuel from the cladding tube by discharging the nuclear fuel through the opening in the cladding tube, and recovering the separated nuclear fuel substantially free of cladding tube content.

2. Method according to claim 1, including mechanically comminuting the nuclear fuel removed from the cladding tube.

3. Method according t claim 1, including dissolving the nuclear fuel removed from the cladding tube in nitric acid in an autoclave.

4. Method according to claim 2, including dissolving the nuclear fuel removed from the cladding tube in nitric acid in an autoclave.

5. Method according to claim 3, wherein the nuclear fuel additionally contains ruthenium and other rare metals as well as of fission gases, wherein the dissolution of the nuclear fuel in the autoclave is in the presence of an oxygen-containing atmosphere forming volatile oxygen compounds of ruthenium and other rare metals, and wherein any volatile oxygen containing compounds of ruthenium and other rare metals as well as of fission gases in the atmosphere of the autoclave are separated therefrom by means of a cooling trap.

* * * * *